Patented Sept. 11, 1923.

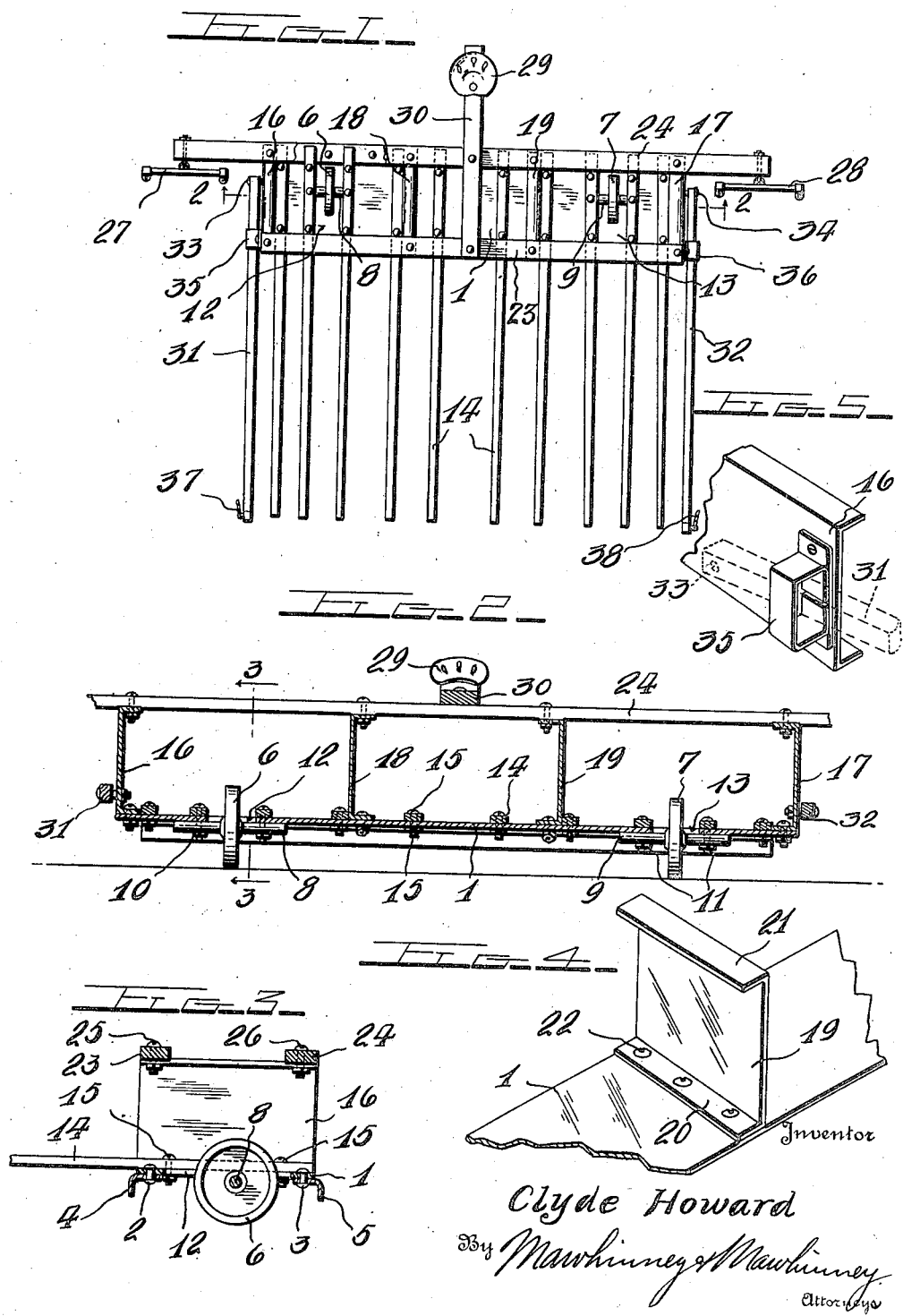

1,467,727

UNITED STATES PATENT OFFICE.

CLYDE HOWARD, OF LINCOLN, NEBRASKA.

HAY SWEEP.

Application filed August 3, 1921. Serial No. 489,461.

*To all whom it may concern:*

Be it known that CLYDE HOWARD, a citizen of the United States, residing at Lincoln, in the county of Lancaster and State of Nebraska, has invented certain new and useful Improvements in Hay Sweeps, of which the following is a specification.

The present invention relates to improvements in hay sweeps, and has for an object to provide a sweep of a greater rigidity as compared with those constructed at the present time, and wherein lightness of construction is secured with a strength equal to, if not greater than, the wooden hay sweeps now in use.

A further object of the invention is to provide a strong, light framework for the sweep in which the capacity of the sweep is increased considerably without correspondingly increasing the weight of the same or making it substantially more difficult for the animals to draw through the field and in which the framework is knit together in a durable construction providing a better support for the driver's seat.

A further object of the invention is to provide an improved hay sweep partially of metal and partly of wood in which the draft animals are required to exert an even pull on the sweep especially when turning or backing.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a plan view of an improved hay sweep constructed according to the present invention;

Fig. 2 is a vertical sectional view taken on the line 2—2 in Fig. 1;

Fig. 3 is a transverse sectional view taken on the line 3—3 in Fig. 2;

Fig. 4 is a fragmentary perspective view showing a portion of the plate and one of the supports; and Fig. 5 is a fragmentary perspective view of one of the end supports showing the guide for the tongue.

Referring more particularly to the drawings, 1 designates a base plate constructed of sheet metal and possessing a high degree of rigidity with a desirable amount of lightness and to this base plate 1 are attached as by rivets or other fastenings 2 and 3 a pair of angle irons 4 and 5 located at the forward and rear edges of the plate 1 and having their depending flanges extending slightly beyond the edges of such plate with their horizontal flanges lying beneath the plate. The plate 1 is supported by wheels 6 and 7 rotating upon axles 8 and 9 journaled in appropriate bearings 10 and 11 lying beneath the base plate 1 and secured thereto in any desired manner. The wheels 6 and 7 extend up through openings 12 and 13 made in the base plate 1 near its ends. A suitable number of rake teeth or bars 14 are carried by the base plate 1 and extend forwardly therefrom the required distance. The rear portions of these bars 14 lie upon the upper face of the base plate to which they are attached by nuts and bolts 15 or other appropriate securing means.

The base plate 1 also carries end supports 16 and 17 and a pair of intermediate supports 18 and 19. These various supports are of sheet metal and are provided with overturned flanges such as shown at 20 and 21 in Fig. 4. The lower flanges 20 rest upon the base plate 1 and are securely fastened thereto by nuts and bolts 22 or otherwise. The upper flanges 21 lie horizontally and are adapted to receive at their forward and rear edges a pair of spaced apart beams 23 and 24, bolts or other fastenings 25 and 26 being employed to secure the beams to the flanges 21.

As shown more particularly in Fig. 1, the rear beam 24 is extended beyond the sides of the sweep where it receives swingle trees 27 and 28 to which are hitched horses or other draft animals. A seat 29 is shown extending rearwardly of the center of the sweep and carried on a beam 30 which is secured to the transversely extending beams 23 and 24. The seat 29 is thus carried at a suitable elevation, the various supports being of a considerable height as compared with the frameworks of former sweeps.

A pair of tongues 31 and 32 are pivoted as indicated at 33 and 34 to the outer sides of the end supports 16 and 17 and lie through guides 35 and 36 which are also attached to the outer sides of the end supports 16 and 17 and limit the vertical swinging movement of the tongues 31 and 32. Chains 37 and 38 or the like are carried by the outer free ends of the tongues 31 and 32 to attach to the draft animals for drawing the sweep in a rearward direction.

The sweep thus constructed is drawn by draft animals hitched to the swingle trees 27 and 28 and to the tongues 31 and 32 through the field, the hay being caught in the teeth 14 and caused to accumulate in front of the various supports and beams. It will be noted that the structure is comparatively high and that the storage space provided by the rake teeth is thus greater than in usual forms of rakes and yet the plate 1 lies at a very low elevation and forms a rigid, strong foundation for the various parts of the machine. The rake teeth 14 are secured to the plate at its upper side and are thus easy to remove and replace. The angle irons 4 and 5 reinforce the plate at its forward and rear edges and encounter inequalities in the ground which would tend to bend the comparatively thin edge of the sheet metal base plate. The seat 29 is also supported at a convenient position, and the greater strength of the sweep, due to the use of the sheet metal, will allow it to accommodate greater weights of the hay without incurring any likelihood of breakage.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved hay sweep comprising a base plate, wheels for supporting the same, teeth extending forwardly from the base plate, supports extending in spaced relation upwardly from the base plate, a pair of beams extending transversely across the tops of the supports, the rear beam being extended beyond the sides of the sweep, swingle trees attached to the extended ends of the beam, a seat carried by said sweep, and pivoted tongues secured to the outermost supports.

2. An improved hay sweep comprising a base plate, wheels for supporting the same, teeth extending forwardly from the base plate, a plurality of supports erected on said base plate, beams extending transversely of the sweep and carried by the said supports, the rear beam being extended beyond the ends of the plate, swingle trees attached to the projecting ends of the beam, tongues pivoted to the sides of the sweep adjacent the swingle trees, and means forwardly of the pivot point of the tongues for guiding the swinging movement thereof.

3. An improved hay sweep of the character described comprising a rigid base plate reinforced at its forward and rear lower edges, wheels for supporting the base plate, teeth extending forwardly from the base plate, a number of sheet metal supports extending in spaced relation upwardly from the base plate, a pair of beams extending transversely across the tops of the supports, the rear beam being extended beyond the sides of the sweep, swingle trees attached to the extended ends of the beam, a seat carried by said beams, a pair of pivoted tongues secured to the outermost supports, and guides secured to said outermost supports and engaging about the tongue.

In testimony whereof I affix my signature.

CLYDE HOWARD.